(12) United States Patent
Zorgui et al.

(10) Patent No.: US 12,464,573 B2
(45) Date of Patent: Nov. 4, 2025

(54) ADAPTING RANDOM ACCESS CHANNEL (RACH) PROCESS PARAMETERS BASED ON A NETWORK POWER MODE

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/969,485

(22) Filed: Oct. 19, 2022

(65) Prior Publication Data

US 2024/0137991 A1 Apr. 25, 2024
US 2024/0237084 A9 Jul. 11, 2024

(51) Int. Cl.
*H04W 74/0833* (2024.01)
*H04W 52/36* (2009.01)
*H04W 74/08* (2024.01)

(52) U.S. Cl.
CPC ....... *H04W 74/0841* (2013.01); *H04W 52/36* (2013.01); *H04W 74/0891* (2013.01)

(58) Field of Classification Search
CPC ............ H04W 74/0841; H04W 52/36; H04W 74/0891; H04W 74/006; H04W 52/146; H04W 52/325; H04W 52/50; H04W 74/0833
See application file for complete search history.

(56) References Cited

U.S. PATENT DOCUMENTS

| | | | | |
|---|---|---|---|---|
| 2011/0076964 | A1* | 3/2011 | Dottling | H04W 52/0206 455/68 |
| 2014/0010131 | A1* | 1/2014 | Gaal | H04L 5/0048 370/311 |
| 2016/0242155 | A1* | 8/2016 | Xu | H04W 24/08 |
| 2016/0353440 | A1* | 12/2016 | Lee | H04W 4/70 |
| 2017/0006547 | A1* | 1/2017 | Fujishiro | H04L 5/0048 |
| 2017/0111891 | A1* | 4/2017 | He | H04L 5/001 |
| 2018/0324766 | A1* | 11/2018 | Qiu | H04W 28/0278 |
| 2020/0120713 | A1* | 4/2020 | Yerramalli | H04W 52/362 |
| 2020/0169970 | A1* | 5/2020 | Liu | H04W 52/00 |
| 2020/0351801 | A1* | 11/2020 | Jeon | H04W 52/48 |

(Continued)

*Primary Examiner* — Ivan O Latorre
(74) *Attorney, Agent, or Firm* — Kevin M. Donnelly; Seyfarth Shaw LLP

(57) ABSTRACT

A method for wireless communication by a user equipment (UE) includes receiving, from a network node, a first message indicating, for each network power mode of a group of network power modes, a group of random-access channel (RACH) process parameters. The method also includes receiving, from the network node, a second message indicating a current network power mode, of the group of network power modes, enabled at the network node. The method further includes receiving, from the network node, a third message including a physical downlink control channel (PDCCH) order that initiates a RACH process in accordance with the respective group of RACH process parameters associated with the current network power mode. The method still further includes transmitting, to the network node based on receiving the PDCCH order, a RACH preamble associated with the RACH process.

20 Claims, 9 Drawing Sheets

(56) References Cited

U.S. PATENT DOCUMENTS

| | | | |
|---|---|---|---|
| 2020/0404713 A1* | 12/2020 | Sakhnini | H04W 56/0045 |
| 2021/0132678 A1* | 5/2021 | An | G06F 3/013 |
| 2021/0298084 A1* | 9/2021 | Taherzadeh Boroujeni | H04W 74/0833 |
| 2021/0329571 A1* | 10/2021 | Yu | H04W 52/50 |
| 2021/0410197 A1* | 12/2021 | Nam | H04W 74/0891 |
| 2022/0124813 A1* | 4/2022 | Cao | H04L 5/0044 |
| 2022/0132596 A1* | 4/2022 | Jeon | H04W 74/0866 |
| 2022/0264477 A1* | 8/2022 | Akkarakaran | H04W 52/283 |
| 2022/0272748 A1* | 8/2022 | Xiong | H04W 72/044 |
| 2022/0272760 A1* | 8/2022 | Murray | H04W 74/0836 |
| 2022/0386409 A1* | 12/2022 | Koskela | H04W 56/0045 |
| 2023/0043517 A1* | 2/2023 | Höglund | H04W 74/0841 |
| 2023/0044766 A1* | 2/2023 | Lei | H04W 74/0833 |
| 2023/0077869 A1* | 3/2023 | Ly | H04W 74/006 370/311 |
| 2023/0108646 A1* | 4/2023 | Tseng | H04W 68/025 455/458 |
| 2023/0112574 A1* | 4/2023 | Tseng | H04W 56/0045 370/331 |
| 2023/0116354 A1* | 4/2023 | Abedini | H04W 74/0833 370/329 |
| 2023/0116481 A1* | 4/2023 | Abedini | H04W 74/0866 370/329 |
| 2023/0164844 A1* | 5/2023 | Lei | H04W 74/0833 370/330 |
| 2023/0284143 A1* | 9/2023 | Abotabl | H04W 74/0841 370/329 |
| 2023/0284279 A1* | 9/2023 | Zhou | H04W 74/006 370/328 |
| 2023/0389120 A1* | 11/2023 | Babaei | H04W 52/0235 |
| 2024/0040628 A1* | 2/2024 | Wu | H04W 74/006 |
| 2024/0073843 A1* | 2/2024 | Zhou | H04W 36/005 |
| 2024/0137991 A1* | 4/2024 | Zorgui | H04W 74/0891 |
| 2024/0155689 A1* | 5/2024 | Kim | H04L 1/08 |
| 2024/0306097 A1* | 9/2024 | Yin | H04W 52/50 |
| 2024/0340856 A1* | 10/2024 | Bai | H04W 72/02 |
| 2024/0365391 A1* | 10/2024 | Bai | H04L 1/12 |
| 2024/0381190 A1* | 11/2024 | Bai | H04W 36/0058 |
| 2025/0097982 A1* | 3/2025 | Abotabl | H04B 7/0626 |

* cited by examiner

ADAPTING RANDOM ACCESS CHANNEL (RACH) PROCESS PARAMETERS BASED ON A NETWORK POWER MODE

FIELD OF THE DISCLOSURE

The present disclosure relates generally to wireless communications, and more specifically to adapting random access channel (RACH) process parameters at a user equipment (UE) based on a network power mode.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communication network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A network node, such as a base station, may be powered by an external power source to provide continuous access to the wireless communication network. In some examples, power consumption of the network node may account for a majority of a total power consumption associated with the wireless communication network. In some such examples, the network node may enable a network power saving mode to reduce the total power consumed by the wireless communication network. Enabling the network power saving mode may change one or more of a reference signal received power (RSRP) measurement at a UE, a network receiver processing gain, or a network detection probability.

SUMMARY

In one aspect of the present disclosure, a method for wireless communication by a user equipment (UE) includes receiving, from a network node, a first message indicating, for each network power mode of a group of network power modes, a group of random-access channel (RACH) process parameters. The method further includes receiving, from the network node, a second message indicating a current network power mode, of the group of network power modes, enabled at the network node. The method still further includes receiving, from the network node, a third message including a physical downlink control channel (PDCCH) order that initiates a RACH process in accordance with the respective group of RACH process parameters associated with the current network power mode. The method also includes transmitting, to the network node based on receiving the PDCCH order, a RACH preamble associated with the RACH process.

Another aspect of the present disclosure is directed to an apparatus including means for receiving, from a network node, a first message indicating, for each network power mode of a group of network power modes, a group of RACH process parameters. The apparatus further includes means for receiving, from the network node, a second message indicating a current network power mode, of the group of network power modes, enabled at the network node. The apparatus still further includes means for receiving, from the network node, a third message including a PDCCH order that initiates a RACH process in accordance with the respective group of RACH process parameters associated with the current network power mode. The apparatus also includes means for transmitting, to the network node based on receiving the PDCCH order, a RACH preamble associated with the RACH process.

In another aspect of the present disclosure, a non-transitory computer-readable medium with non-transitory program code recorded thereon is disclosed. The program code is executed by a processor and includes program code to receive, from a network node, a first message indicating, for each network power mode of a group of network power modes, a group of RACH process parameters. The program code further includes program code to receive, from the network node, a second message indicating a current network power mode, of the group of network power modes, enabled at the network node. The program code still further includes program code to receive, from the network node, a third message including a PDCCH order that initiates a RACH process in accordance with the respective group of RACH process parameters associated with the current network power mode. The program code also includes program code to transmit, to the network node based on receiving the PDCCH order, a RACH preamble associated with the RACH process.

Another aspect of the present disclosure is directed to an apparatus for wireless communications at a UE. The apparatus may include a processor, and a memory coupled with the processor and storing instructions operable, when executed by the processor, to cause the apparatus to receive, from a network node, a first message indicating, for each network power mode of a group of network power modes, a group of RACH process parameters. Execution of the instructions also cause the apparatus to receive, from the network node, a second message indicating a current network power mode, of the group of network power modes, enabled at the network node. Execution of the instructions further cause the apparatus to receive, from the network node, a third message including a PDCCH order that initiates a RACH process in accordance with the respective group of RACH process parameters associated with the current network power mode. Execution of the instructions still further cause the apparatus to transmit, to the network node based on receiving the PDCCH order, a RACH preamble associated with the RACH process.

In one aspect of the present disclosure, a method for wireless communication by a UE includes receiving, from a network node, a first message indicating a current network power mode, of a group of network power modes, enabled at the network node. The method further includes initiating a RACH process based on receiving the first message. The method still further includes receiving, from the network node based on initiating the RACH process, a third message indicating a group of RACH process parameters associated with the current network power mode.

Another aspect of the present disclosure is directed to an apparatus including means for receiving, from a network node, a first message indicating a current network power mode, of a group of network power modes, enabled at the network node. The apparatus further includes means for initiating a RACH process based on receiving the first message. The apparatus still further includes means for receiving, from the network node based on initiating the RACH process, a third message indicating a group of RACH process parameters associated with the current network power mode.

In another aspect of the present disclosure, a non-transitory computer-readable medium with non-transitory program code recorded thereon is disclosed. The program code is executed by a processor and includes program code to receive, from a network node, a first message indicating a current network power mode, of a group of network power modes, enabled at the network node. The program code further includes program code to initiate a RACH process based on receiving the first message. The program code still further includes program code to receive, from the network node based on initiating the RACH process, a third message indicating a group of RACH process parameters associated with the current network power mode.

Another aspect of the present disclosure is directed to an apparatus for wireless communications at a UE. The apparatus may include a processor, and a memory coupled with the processor and storing instructions operable, when executed by the processor, to cause the apparatus to receive, from a network node, a first message indicating a current network power mode, of a group of network power modes, enabled at the network node. Execution of the instructions also cause the apparatus to initiate a RACH process based on receiving the first message. Execution of the instructions further cause the apparatus to receive, from the network node based on initiating the RACH process, a third message indicating a group of RACH process parameters associated with the current network power mode.

In one aspect of the present disclosure, a method for wireless communication by a UE includes receiving, from a network node, a first message including a PDCCH order. The method further includes receiving, from the network node, a second message indicating a current network power mode, of a group of network power modes, enabled at the network node. The method still further includes initiating, based on receiving the PDCCH order, a RACH process. The method also includes receiving, from the network node based on receiving the second message, a third message indicating a group of RACH process parameters associated with the current network power mode.

Another aspect of the present disclosure is directed to an apparatus including means for receiving, from a network node, a first message including a PDCCH order. The apparatus further includes means for receiving, from the network node, a second message indicating a current network power mode, of a group of network power modes, enabled at the network node. The apparatus still further includes means for initiating, based on receiving the PDCCH order, a RACH process. The apparatus also includes means for receiving, from the network node based on receiving the second message, a third message indicating a group of RACH process parameters associated with the current network power mode.

In another aspect of the present disclosure, a non-transitory computer-readable medium with non-transitory program code recorded thereon is disclosed. The program code is executed by a processor and includes program code to receive, from a network node, a first message including a PDCCH order. The program code further includes program code to receive, from the network node, a second message indicating a current network power mode, of a group of network power modes, enabled at the network node. The program code still further includes program code to initiates, based on receiving the PDCCH order, a RACH process. The program code also includes program code to receive, from the network node based on receiving the second message, a third message indicating a group of RACH process parameters associated with the current network power mode.

Another aspect of the present disclosure is directed to an apparatus for wireless communications at a UE. The apparatus may include a processor, and a memory coupled with the processor and storing instructions operable, when executed by the processor, to cause the apparatus to receive, from a network node, a first message including a PDCCH order. Execution of the instructions also cause the apparatus to receive, from the network node, a second message indicating a current network power mode, of a group of network power modes, enabled at the network node. Execution of the instructions further cause the apparatus to initiates, based on receiving the PDCCH order, a RACH process. Execution of the instructions still further cause the apparatus to receive, from the network node based on receiving the second message, a third message indicating a group of RACH process parameters associated with the current network power mode.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
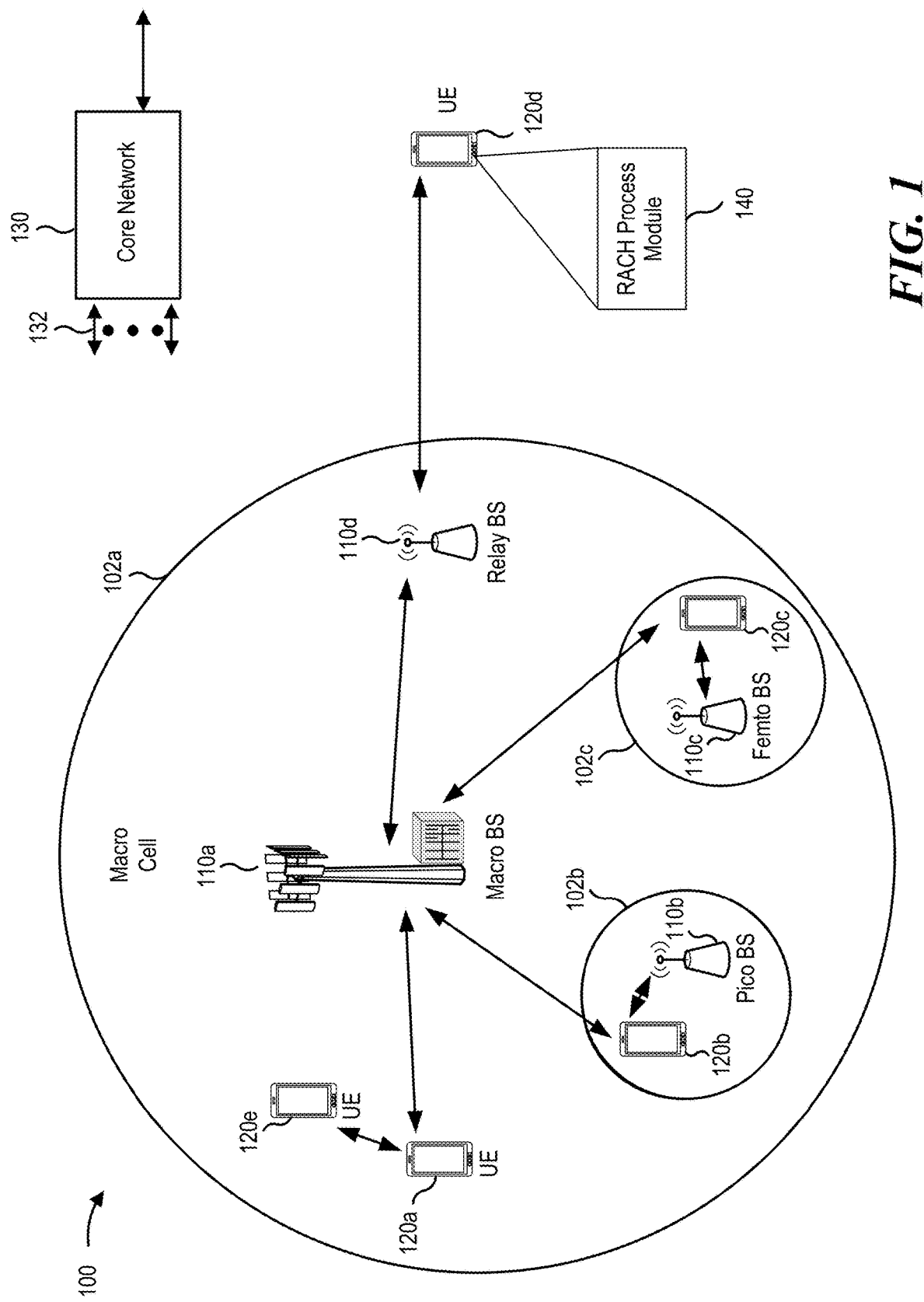
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G wireless technologies, aspects of the present disclosure can be applied in other generation-based communications systems, such as and including 6G and later wireless technologies.

To reduce the total power consumed by a wireless communication network, a network may enable one or more network power saving modes. In some examples, the network may selectively switch among a normal network power mode and one or more of a group of network power saving modes (for example, including a light sleep mode and a deep sleep mode). In some examples, based on enabling a network power saving mode, the network node may reduce one or more of a transmission power, a number of active transmission antennas, or a number of active reception antennas. Reducing the number of active transmission antennas may reduce the transmission power of the network node. In some examples, reducing one or more of the transmission power, the number of active transmission antennas, or the number of active reception antennas may change (for example, reduce) a respective value associated with each of one or more network parameters of a group of network parameters. The group of network parameters may include one or more of a reference signal received power (RSRP), a network receiver processing gain, or a network detection probability (for example, a probability that the network node will successfully decode a transmission). In some examples, reducing a respective value associated with at least one network parameter of the one or more network parameters may cause a RACH process to fail.

In some other examples, a first network node may enable a compensation mode (for example, another type of network power mode) based on a second network node enabling one or more network power saving modes. In such examples, the first network node and the second network node may be neighboring network nodes. Network coverage from the second network node may be reduced based on the second network node enabling the one or more network power saving modes. In such examples, the first network node may enable the compensation mode to compensate (for example, provide service continuity) for the reduced network coverage. In some examples, based on enabling the compensation mode, the first network node may increase one or more of a transmission power, a number of active transmission antennas, or a number of active reception antennas. In some such examples, increasing one or more of the transmission power, the number of active transmission antennas, or the number of active reception antennas may change (for example, increase) a respective value associated with each of the one or more network parameters of the group of network parameters. However, in some such examples, increasing the respective value associated with at least one network parameter of the one or more network parameters may cause a RACH process to fail.

Various aspects of the present disclosure are directed to adapting a RACH process to a current network power mode enabled by a network node. In some examples, a user equipment (UE) may receive, from the network node, a first message indicating, for each network power mode of a group of network power modes, a respective group of RACH process parameters. The group of network power modes may include one or more network power saving modes as well as a compensation mode. Each group of RACH process parameters may include, for example, one or more of an RSRP threshold value for selecting a synchronization signal block (SSB), an initial value for a random access preamble power, a power ramping factor for random access preamble retransmissions, or a maximum number of random access preamble transmissions. In such examples, the UE may also receive, from the network node, a second message indicating a current network power mode, of the group of network power modes, enabled at the network node. After receiving the second message, the UE may receive a third message including a physical downlink control channel (PDCCH) order that initiates a RACH process in accordance with the respective group of RACH process parameters associated with the current network power mode. The UE may then transmit, based on receiving the PDCCH order, a RACH preamble associated with the initiated RACH process.

In some other examples, the UE receives a group of RACH process parameters, associated with a current network power mode, after the network node enables the current network power mode. In some such examples, the UE may first receive, from the network node, a first message including a PDCCH order that initiates a RACH process. The UE may then initiate the RACH process based on receiving the PDCCH order. In such examples, after initiating the RACH process, the UE may receive a second message indicating a current network power mode, of a group of network power modes, enabled at the network node. The UE may also receive, based on initiating the RACH process, a third message indicating a group of RACH process parameters associated with the current network power mode. The RACH process may continue in accordance with the respective group of RACH process parameters associated with the current network power mode. In such examples, the RACH process is an example of a contention-based RACH process.

In examples in which the UE receives the group of RACH process parameters associated with the current network power mode after the network node enables the current network power mode, the UE may fail to decode the first message including the PDCCH order. In some such examples, the UE may initiate the RACH process based on receiving the second message indicating the current network power mode, of a group of network power modes, enabled at the network node. As discussed, based on initiating the RACH process, the UE may then receive the third message indicating the group of RACH process parameters associated with the current network power mode.

Particular aspects of the subject matter described in this disclosure may be implemented to realize one or more of the following potential advantages. In some examples, by receiving an indication of RACH process parameters associated with a current network power mode enabled by a network node, techniques disclosed may configure a UE to initiate a RACH process in accordance with the group of RACH process parameters associated with the current network power mode. Initiating the RACH process in accordance with the group of RACH process parameters may reduce RACH process failures caused by changing a respective value associated with at least one network parameter of one or more network parameters based on the network node enabling the current network power mode. Reducing the RACH process failures may reduce network connection failures while also allowing the network node to enable a power saving mode or a compensation mode.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a RACH process module 140. For brevity, only one UE 120*d* is shown as including the RACH process module 140. The power saving module 140 may perform one or more steps described with reference to the process 700, 800, and 900 described with reference to FIGS. 7,8, and 9, respectively.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
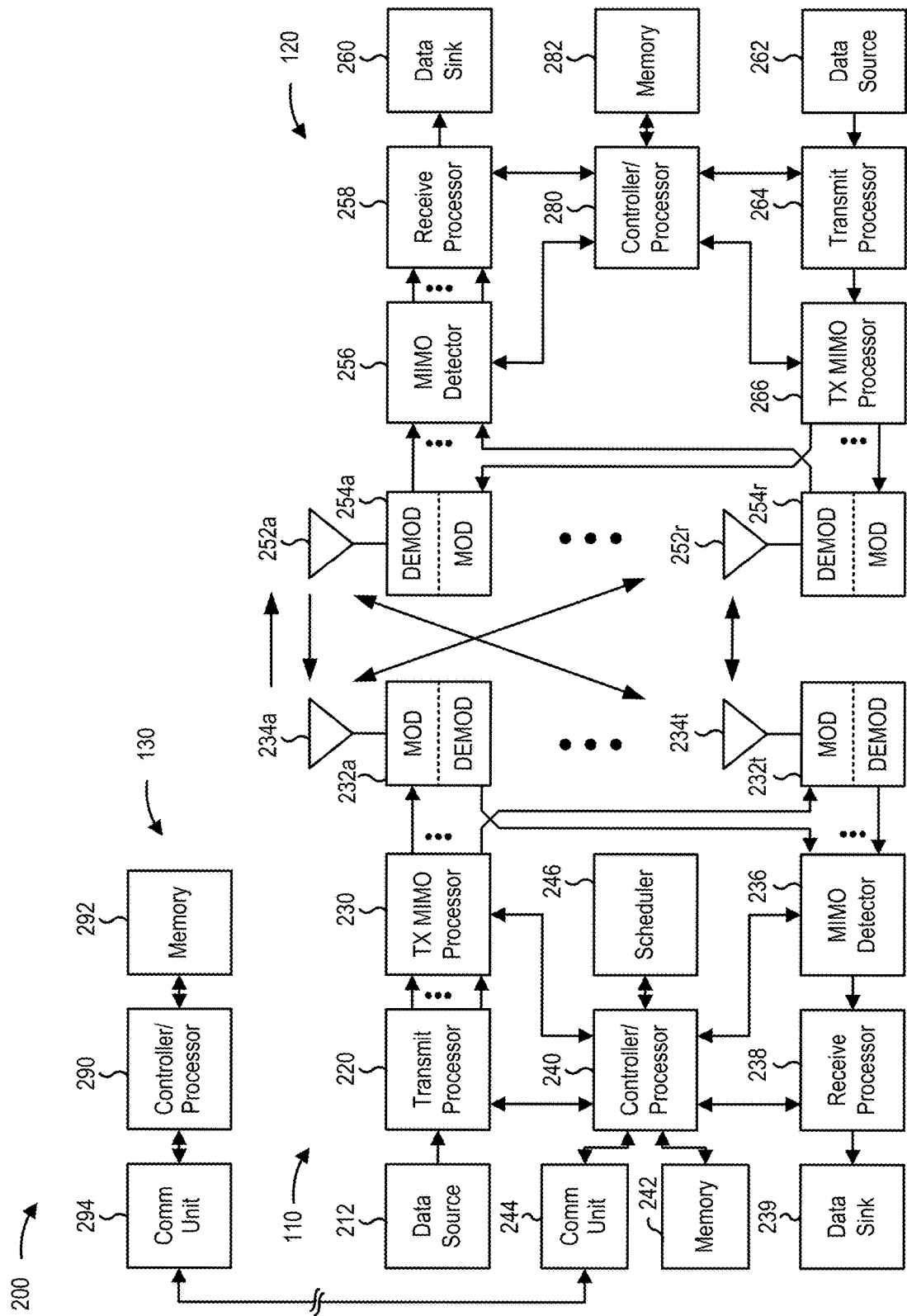
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with configuring one or more power saving functions as described in more detail elsewhere. For example, the controller/processor 240 of the base station 110, the controller/processor 280 of the UE 120, and/or any other component(s) of FIG. 2 may perform or direct operations of, for example, the processes of FIGS. 7, 8, and 9 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
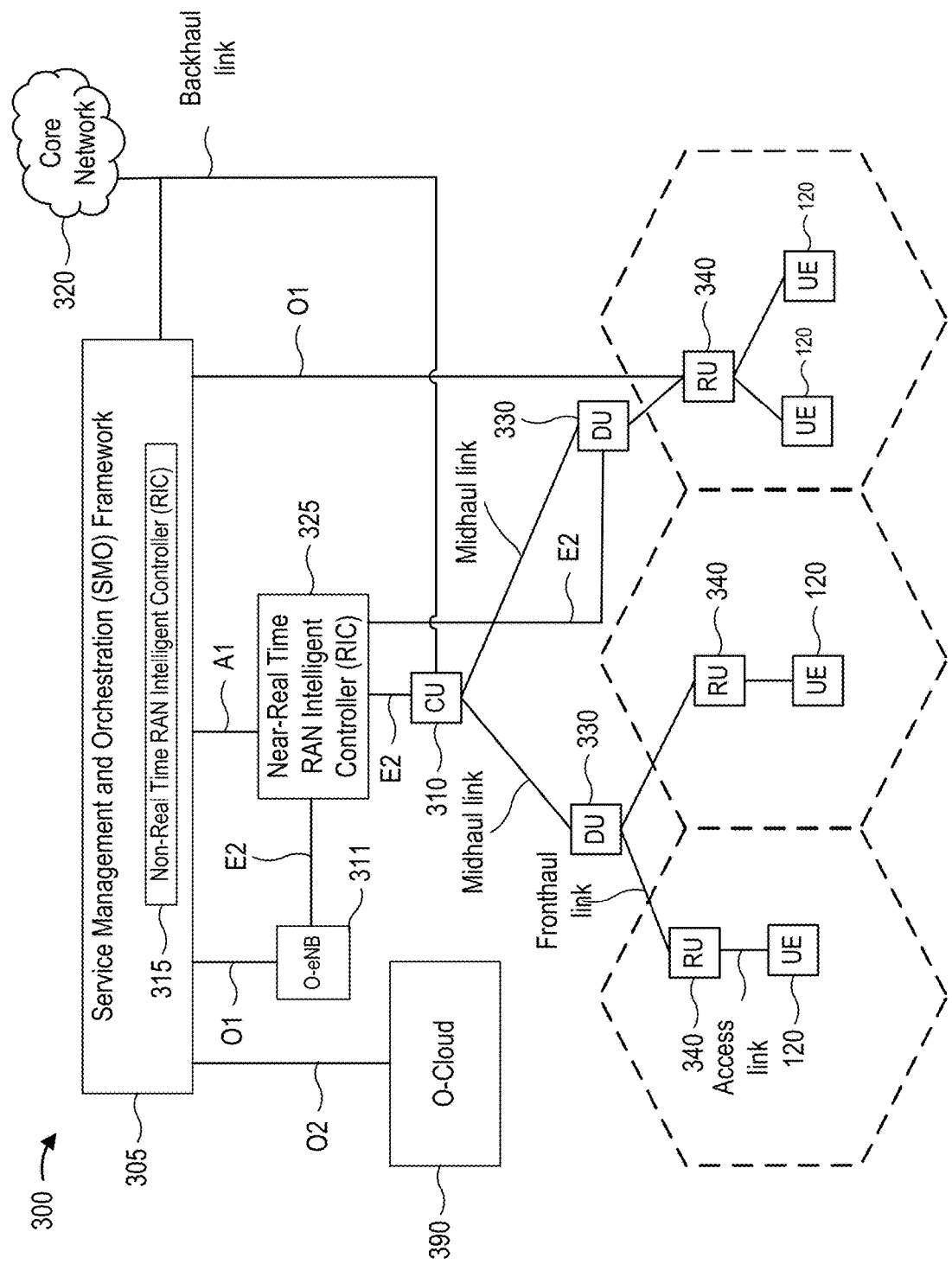
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit—user plane (CU-UP)), control plane functionality (for example, central unit—control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As discussed, to reduce the total power consumed by a wireless communication network, a network may enable a network power saving mode. In some examples, the network may enable one network power saving mode selected from a group of network power saving modes (for example, including a light sleep mode and a deep sleep mode). The network power saving mode is an example of a network power mode. In some examples, based on enabling the network power saving mode, the network node may reduce one or more of a transmission power, a number of active transmission antennas, or a number of active reception antennas. In some such examples, reducing the number of active transmission antennas may reduce the transmission power of the network node. In some examples, reducing one or more of a transmission power, a number of active transmission antennas, or a number of active reception antennas may change (for example, reduce) a respective value associated with one or more network parameters of the group of network parameters. Additionally, or alternatively, the network node may perform other techniques to reduce the total amount power consumed at the network node. The group of network parameters may include one or more of a reference signal received power (RSRP), a network receiver processing gain, or a network detection probability (for example, a probability that the network node will receive a transmission). In some such examples, reducing the respective value associated with each network parameter of the one or more network parameters may cause a RACH process to fail.

In some examples, a UE may measure an RSRP of a synchronization signal block (SSB) to select a RACH occasion (RO). The RO may satisfy selection criteria if the RSRP measurement is greater than an SSB RSRP threshold. The SSB RSRP threshold may be based on a transmit power associated with the SSB. In some examples, the network node may reduce an SSB transmission power as a result of enabling a network power saving mode. In such examples, the SSB RSRP threshold may not be adjusted after the network reduces the SSB transmission power. Therefore, after the network node enables the network power saving mode, a value of the RSRP measurement may be less than the SSB RSRP threshold. In such examples, the UE may fail to identify an RO that satisfies selection criteria when the RSRP measurement is less than the SSB RSRP threshold. The RACH process may fail if the UE fails to identify an RO that satisfies the selection criteria. In some examples, the UE may identify an RO that satisfies the selection criteria if the SSB RSRP threshold is adapted to accommodate the SSB transmission power associated with the current network power mode.

Additionally, or alternatively, in some examples, enabling a network power saving mode may reduce a number of active transmission antennas, which may increase a receiver processing gain of the network node because the receiver processing gain may be inversely proportional to the number of active transmission antennas. In such examples, the network node may fail to receive RACH signals, such as a RACH preamble, from the UE if one or both of the initial transmission power or the power ramping step of the RACH signal is not adapted to accommodate the receiver processing gain corresponding to a number of active transmission antennas associated with a current power mode.

Additionally, or alternatively, in some examples, enabling a network power saving mode may reduce a number of active reception antennas, which may reduce a detection probability of the network node. The detection probability is a probability of receiving an uplink transmission at the network node. The detection probability may also be referred to as the detection capability. In such examples, the network node may fail to receive a preamble transmission if a maximum number of preamble transmissions is not adapted to accommodate the detection probability corresponding to a number of active reception antennas associated with a current power mode.

As discussed, aspects of the present disclosure are not limited to reducing one or more of a transmission power, a number of active transmission antennas, or a number of active reception antennas at a network node. In some other examples, the network node may enable a compensation mode to change (for example, increase) the respective values associated with one or more network parameters of the group of network parameters. The compensation mode may be enabled by one network node to provide service continuity based on one or more neighboring network nodes enabling a network power saving mode. Additionally, the compensation mode may be an example of a network power mode. In some such examples, increasing the respective value associated with the one or more network parameters may cause a RACH process to fail.

Figure 4:
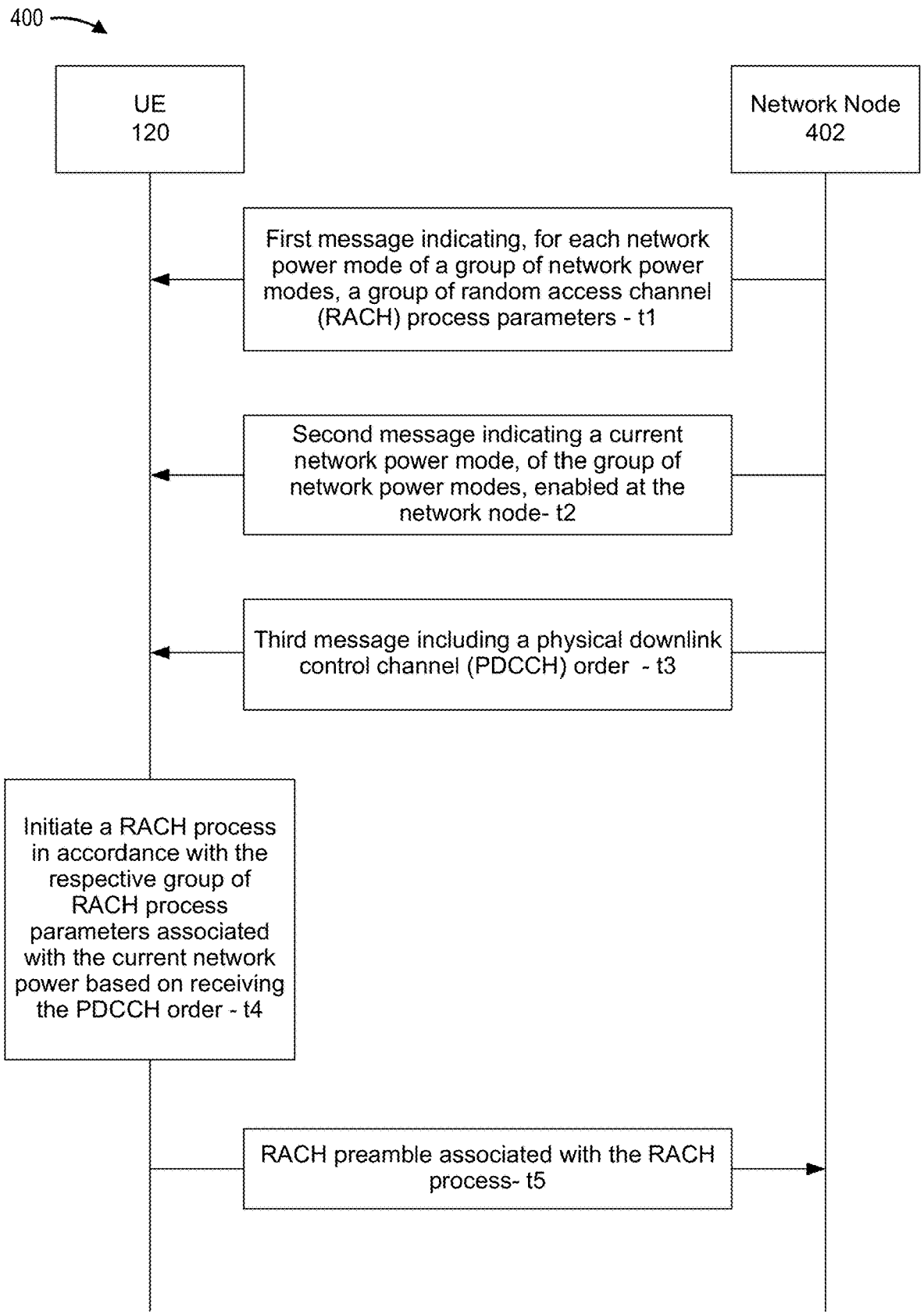
FIG. 4 is a timing diagram illustrating an example of adapting random access channel (RACH) process parameters to a current network power mode, in accordance with various aspects of the present disclosure.

Various aspects of the present disclosure are directed to adapting a RACH process to a current network power mode enabled by a network node. FIG. 4 is a timing diagram 400 illustrating an example of adapting a RACH process to a current network power mode, in accordance with various aspects of the present disclosure. In the example of FIG. 4, a UE 120 may communicate with a network node 402. The network node 402 may be an example of a base station 110, as described with reference to FIGS. 1 and 2, or a CU 310, DU 330, or RU 340, as described with reference to FIG. 3.

As shown in the example of FIG. 4, at time t1, the UE 120 may receive, from the network node 402, a first message indicating, for each network power mode of a group of network power modes, a group of RACH process parameters. In some examples, the first message may be a master information block (MIB), a system information block (SIB), or on-demand system information (SI). Additionally, in some examples, each group of RACH process parameters may include one or more of an RSRP threshold value for selecting an SSB (for example, rsrp-ThresholdSSB or msgA-RSRP-Threshold), an initial value for a random access preamble power (for example, preambleReceivedTargetPower or msgA-PreambleReceivedTargetPower), a power ramping factor for random access preamble retransmissions (for example, powerRampingStep or msgA-PreamblePowerRampingStep), or a maximum number of random access preamble transmissions (for example, preambleTransMax or rsrp-ThresholdSSB). The group of RACH process parameters may include a first set of RACH process parameters for a two-step RACH process and a second set of RACH process parameters for a four-step RACH process. The second set of RACH process parameters may be different than the first set of RACH process parameters. The group of RACH process parameters may be used for either a contention-based RACH process or a contention-free RACH process.

As shown in the example of FIG. 4, at time t2, the UE 120 may receive, from the network node 402, a second message indicating a current network power mode, of the group of network power modes, enabled at the network node 402. As discussed, the group of network power modes may include one or both of a group of network power saving modes or a compensation mode. At time t3, the UE 120 may receive, from the network node 402, a third message including a PDCCH order. At time t4, the UE 120 initiates a RACH process in accordance with the respective group of RACH process parameters associated with the current network power based on receiving the PDCCH order. At time t5, the UE 120 transmits, to the network node 402 based on receiving the PDCCH order at the t3, a RACH preamble associated with the RACH process.

In an optional configuration, prior to time t1 or after time t1, the UE 120 may receive, from the network node 402, a fourth message indicating a group of RACH process threshold values. Alternatively, the group of RACH process threshold values may be indicated in the first message. In some examples, each group of offset values and the group of RACH process threshold values may be indicated via one or more SIBs. Each RACH process threshold corresponds to a RACH process parameter. In such configurations, each group of RACH process parameters received at time t1 may include a group of offset values. Each offset value of the group of offset values is an offset from a respective RACH process threshold value of the group of RACH process threshold values. Table 1 is an example of a respective group of offset values corresponding to each network power mode of a group of network power modes.

and $\delta'''_1$) corresponds to a first mode (Mode 1). A value of each RACH process parameter may be based on the respective offset value applied to the RACH process threshold value. Therefore, in the example of FIG. 4, if the UE 120 receives groups of offset values and the group of RACH process, the UE 120 may initiate the RACH process in accordance with the respective group of RACH process parameters associated with the current network power mode. In this case, a respective value of each RACH process parameter may be based on the respective offset value applied to the RACH process threshold value.

As discussed, in some examples, the network node may reduce one or both of its transmission power or a number of active antenna elements to reduce a total amount of power consumed by the network node. In some implementations, in the example of FIG. 4, the first message received at time t1 may be a radio resource configuration (RRC) message. In some such implementations, each group of RACH process parameters may include one or both of a set of RSRP threshold parameters or a set of power ramping factor parameters. The set of RSRP threshold parameters and the set of power ramping factor parameters may be examples of granular parameters for each transmission power (for example, SSB transmission power) or active antenna configurations available within each network power mode.

As discussed, when the network node changes a transmission power to reduce an amount of consumed energy, or for energy compensation, the SSB RSRP threshold may be updated to accommodate the new transmission power (for example, SSB transmission power). The SSB RSRP threshold may be updated via an RRC configuration. In some examples, each of the set of RSRP threshold parameters corresponds to a respective synchronization signal block (SSB) power reduction value, of a group of SSB power reduction values, associated with a respective network power mode of the group of network power modes. The SSB power reduction factors represent a reduction from a baseline SSB transmission power. For example, an SSB power reduction factor of two (for example, X2) may reduce the baseline SSB transmission power by a factor of two. Table 2 is an example of a mapping between SSB transmission power reduction factors and RSRP threshold parameters associated with the SSB RSRP threshold (for example, RSRP-ThresholdSSB).

TABLE 1

| Network Power Mode | RSRP-ThresholdSSB change $\delta_t$ | preambleReceived TargetPower $\delta_t'$ | preambleTrans Max $\delta_t''$ | powerRamping Step $\delta_t'''$ |
|---|---|---|---|---|
| Mode 1 | $\delta_1$ | $\delta_1'$ | $\delta_1''$ | $\delta_1'''$ |
| Mode 2 | $\delta_2$ | $\delta_2'$ | $\delta_2''$ | $\delta_2'''$ |
| Mode 3 | $\delta_3$ | $\delta_3'$ | $\delta_3''$ | $\delta_3'''$ |

As shown in the example of Table 1, each RACH process parameter (for example, RSRP-ThresholdSSB change, preambleReceived TargetPower, preambleTransMax, and powerRampingStep) may be associated with a respective RACH process threshold value (for example, $\delta_t$, $\delta_t'$, $\delta_t''$, and $\delta_t'''$). As discussed, each group of RACH process parameters received at time t1 may include a group of offset values (for example, $\delta_n$, $\delta_n'$, $\delta_n''$, and $\delta_n'''$). Each group of offset values may correspond to a mode. For example, as shown in the example of Table 1, a group of first offset values ($\delta_1$, $\delta_1'$, $\delta_1''$,

TABLE 2

| SSB Power Reduction | RSRP Threshold Parameter |
|---|---|
| X1 | $\delta_1$ |
| X2 | $\delta_2$ |
| X3 | $\delta_3$ |
| X4 | $\delta_4$ |

In the example of Table 2, each RSRP threshold parameter may be associated with a value or an offset (for example, $\delta_n$) from a threshold value (not shown in Table 2). For a given network power mode, a value of the SSB RSRP threshold may be based on the RSRP threshold parameter associated with the SSB power reduction factor. The SSB power reduction factors are not limited to the SSB power reduction factors shown in Table 2. Additional SSB power reduction factors are contemplated. Additionally, in some examples, the SSB transmission power may be increased.

As discussed, when the network node changes an antenna configuration (for example, changes a number of active antennae) to reduce an amount of consumed energy or for energy compensation, the SSB RSRP threshold and a power ramping step may be updated to accommodate the new antenna configuration. The SSB RSRP threshold and the power ramping step may be updated via an RRC configuration. In some examples, each of the set of RSRP threshold parameters and each of the set of power ramping factor parameters corresponds to a respective antenna configuration, of a group of antenna configurations, associated with a respective network power mode of the group of network power modes. Table 3 is an example of a mapping between antenna configurations associated with a network power mode and both RSRP threshold parameters associated with the SSB RSRP threshold (for example, RSRP-Threshold-SSB) and power ramping factor parameters.

TABLE 3

| Antenna Configuration | RSRP Threshold Parameter | Power Ramping Step |
|---|---|---|
| 8 × 8 | $\delta_1$ | $\delta_1'$ |
| 4 × 8 | $\delta_2$ | $\delta_2'$ |
| 4 × 4 | $\delta_3$ | $\delta_3'$ |
| 2 × 4 | $\delta_4$ | $\delta_4'$ |

In the example of Table 3, each RSRP threshold parameter and power ramping step parameter may be associated with a value or an offset (for example, $\delta_n$) from a threshold value (not shown in Table 3). For a given network power mode, a value of the SSB RSRP threshold may be based on the RSRP threshold parameter associated with the antenna configuration of the given network power mode. Additionally, a value power ramping step may be based on the power ramping step parameter associated with the antenna configuration of the given network power mode. The antenna configurations are not limited to the antenna configurations shown in Table 3. Other antenna configurations are contemplated.

Figure 5:
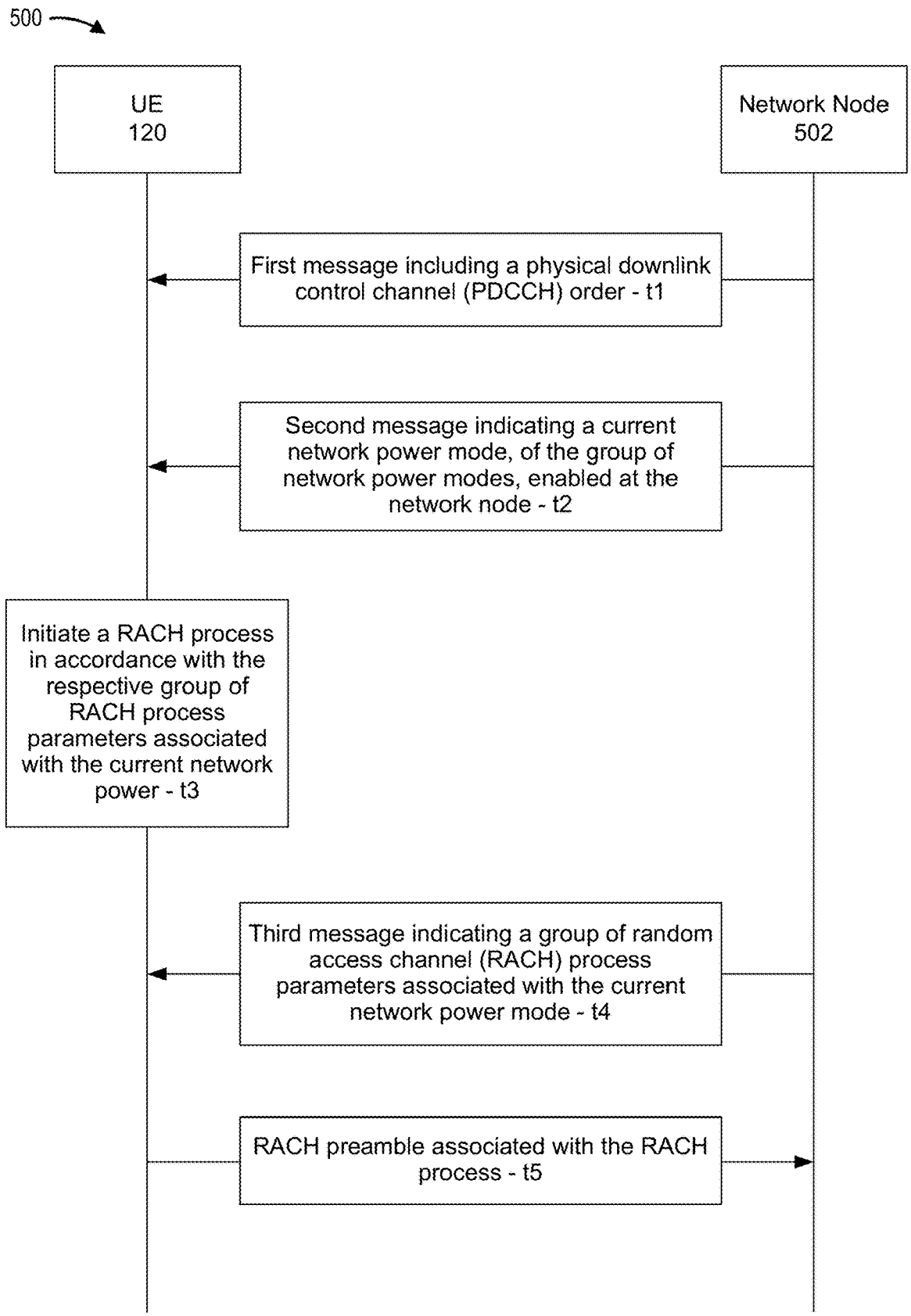
FIG. 5 is a timing diagram illustrating an example of adapting RACH process parameters to a current network power mode, in accordance with various aspects of the present disclosure.

In some examples, the UE receives a group of RACH process parameters, associated with the current network power mode, after the network node enables the current network power mode. FIG. 5 is a timing diagram 500 illustrating an example of receiving a group of RACH process parameters after a network node 502 enables the current network power mode, in accordance with various aspects of the present disclosure. In the example of FIG. 5, a UE 120 may communicate with the network node 502. The network node 502 may be an example of a base station 110, as described with reference to FIGS. 1 and 2, or a CU 310, DU 330, or RU 340, as described with reference to FIG. 3.

As shown in the example of FIG. 5, at time t1 the UE 120 may receive, from the network node 502, a first message including a PDCCH order. In some examples, the PDCCH order may allocate resources for the UE 120 to initiate a RACH process. In such examples, the UE 120 may use the resources, allocated by the PDCCH order, to transmit a RACH preamble in a contention-free RACH process. At time t2, the UE 120 may receive, from the network node 502, a second message indicating a current network power mode, of a group of network power modes, enabled at the network node 502. As discussed, the group of network power modes may include one or both of a group of network power saving modes or a compensation mode. At time t3, the UE 120 may initiate a RACH process in accordance with the group of RACH process parameters associated with the current network power mode. The RACH process may be initiated based on receiving the PDCCH order. At time t4, the UE 120 may receive, from the network node 502 based on receiving the second message, a third message indicating a group of RACH process parameters associated with the current network power mode.

In some examples, the third message is an RRC message. Additionally, in some examples, at time t5, the UE 120 may transmit a RACH preamble to the network node 502 based on initiating the RACH process. The RACH preamble may be transmitted on resources indicated by the PDCCH order. In such examples, the RACH process may be a contention-free RACH process. In some examples, the RACH process continues in accordance with the group of RACH process parameters associated with the current network power mode (for example, the group of RACH process parameters received in the third message).

In some examples, the UE 120 may fail to receive or decode the first message transmitted by the network node 502 at time t1. In such examples, the UE 120 may use the second message, received at time t2, as an indication to initiate the PRACH process. Specifically, the indication that the network node 502 enabled the current network power mode may be used to initiate the RACH process. In some such examples, the UE 120 initiates the PRACH process in a contention-based manner. Alternatively, in other such examples, the UE 120 may have been previously configured (for example, prior to time t1), by the network node 502, with PRACH resources via control signaling, such as an RRC message or a medium access control (MAC) control element (CE) (MAC-CE). In such examples, the UE 120 may use the previously configured resource when initiating the RACH process, such that the RACH process may be performed in a contention-free manner. In such examples, the UE 120 may transmit, to the network node 502, a RACH preamble using the previously configured resource. The resources used for the RACH preamble and the RACH process may be the first resource after a pre-determined time after receiving the second message (time t2).

In some implementations, at time t4, the third message may include one or more groups of RACH process parameters, in which one group of RACH process parameters is associated with the current network power mode. Other groups of RACH process parameters, of the one or more groups of RACH process parameters, may be associated with other network power modes that are not currently enabled.

Figure 6:
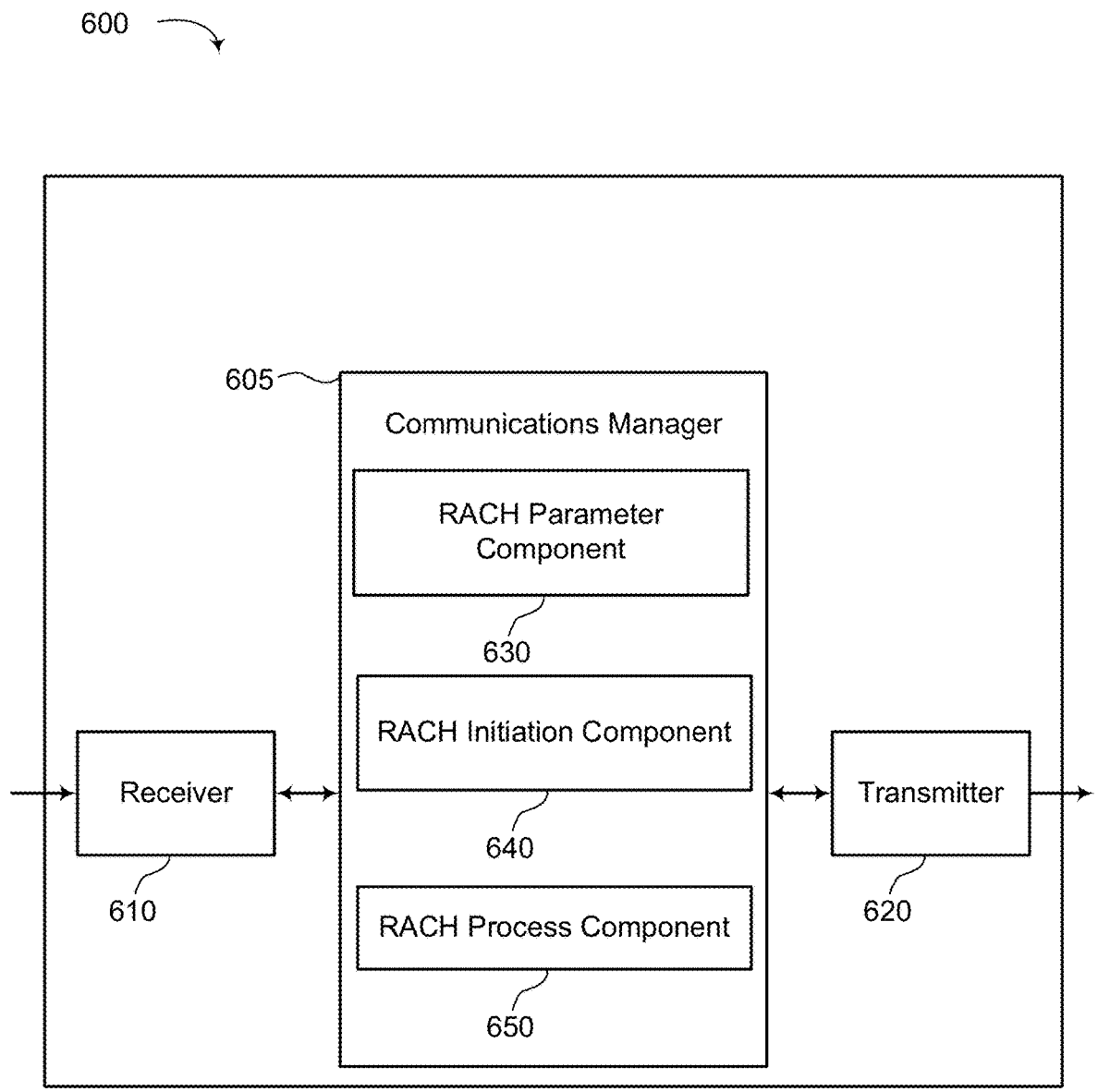
FIG. 6 is a block diagram illustrating an example of a wireless device that supports adapting RACH process parameters to a current network power mode in accordance with various aspects of the present disclosure.

FIG. 6 is a block diagram illustrating an example wireless communication device 600 that supports one or more power saving functions, in accordance with some aspects of the present disclosure. The device 600 may be an example of aspects of a UE 120 described with reference to FIGS. 1, 2, 3, 4, and 5. The wireless communication device 600 may include a receiver 610, a communications manager 605, a transmitter 620, a RACH parameter component 630, a RACH initiation component 640, and a RACH process component 650 which may be in communication with one another (for example, via one or more buses). In some examples, the wireless communication device 600 is configured to perform operations, including operations of the process 700, 800, and 900 described below with reference to FIGS. 7, 8, and 9, respectively.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel (PSCCH) and data channels (for example, a physical downlink shared channel (PDSCH), physical sidelink shared channel (PSSCH), a physical uplink shared channel (PUSCH)). The other wireless communication devices may include, but are not limited to, a base station 110 as described with reference to FIGS. 1 and 2, a CU 310, DU 330, or RU 340 as described with reference to FIG. 3, or a network node 402 and 502 described with reference to FIGS. 4 and 5.

The received information may be passed on to other components of the device 600. The receiver 610 may be an example of aspects of the receive processor 256 described with reference to FIG. 2. The receiver 610 may include a set of radio frequency (RF) chains that are coupled with or otherwise utilize a set of antennas (for example, the set of antennas may be an example of aspects of the antennas 252 described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 266 described with reference to FIG. 2. The transmitter 620 may be coupled with or otherwise utilize a set of antennas (for example, the set of antennas may be an example of aspects of the antennas 252 described with reference to FIG. 2), which may be antenna elements shared with the receiver 610. In some examples, the transmitter 620 is configured to transmit control information in a PUCCH, PSCCH, or PDCCH and data in a physical uplink shared channel (PUSCH), PSSCH, or PDSCH.

The communications manager 605 may be an example of aspects of the controller/processor 259 described with reference to FIG. 2. The communications manager 605 may include the RACH parameter component 630, the RACH initiation component 640, and the RACH process component 650. In some examples, working in conjunction with the receiver 610, the RACH parameter component 630 may receive, from a network node, a first message indicating, for each network power mode of a group of network power modes, a group of RACH process parameters. Working in conjunction with the receiver 610, the RACH parameter component 630 may also receive, from the network node, a second message indicating a current network power mode, of the group of network power modes, enabled at the network node. Additionally, working in conjunction with one or more of the receiver 610 or the RACH parameter component 630, the RACH initiation component 640 may receive, from the network node, a third message including a PDCCH order that initiates a RACH process in accordance with the respective group of RACH process parameters associated with the current network power mode. Furthermore, working in conjunction with one or more of the transmitter 620, the RACH parameter component 630, or the RACH initiation component 640, the RACH process component 650 may transmit, to the network node based on receiving the PDCCH order, a RACH preamble associated with the RACH process.

In some other examples, working in conjunction with the receiver 610, the RACH initiation component 640 may receive, from a network node, a first message indicating a current network power mode, of a group of network power modes, enabled at the network node. Additionally, working in conjunction with one or more of the transmitter 620, the RACH initiation component 640 may initiate a RACH process based on receiving the first message. Furthermore, working in conjunction with the receiver 610, the RACH parameter component 630 may receive, from the network node based on initiating the RACH process, a third message indicating a group of RACH process parameters associated with the current network power mode.

In some other examples, working in conjunction with the receiver 610, the RACH initiation component 640 may receive, from a network node, a first message including a PDCCH order. Additionally, working in conjunction with the receiver 610, the RACH initiation component 640 may receive, from the network node, a second message indicating a current network power mode, of a group of network power modes, enabled at the network node. Working in conjunction with the transmitter 620. the RACH initiation component 640 may initiate, based on receiving the PDCCH order, a RACH process. Furthermore, working in conjunction with the receiver 610, the RACH parameter component 630 may receive, from the network node based on receiving the second message, a third message indicating a group of RACH process parameters associated with the current network power mode.

Figure 7:
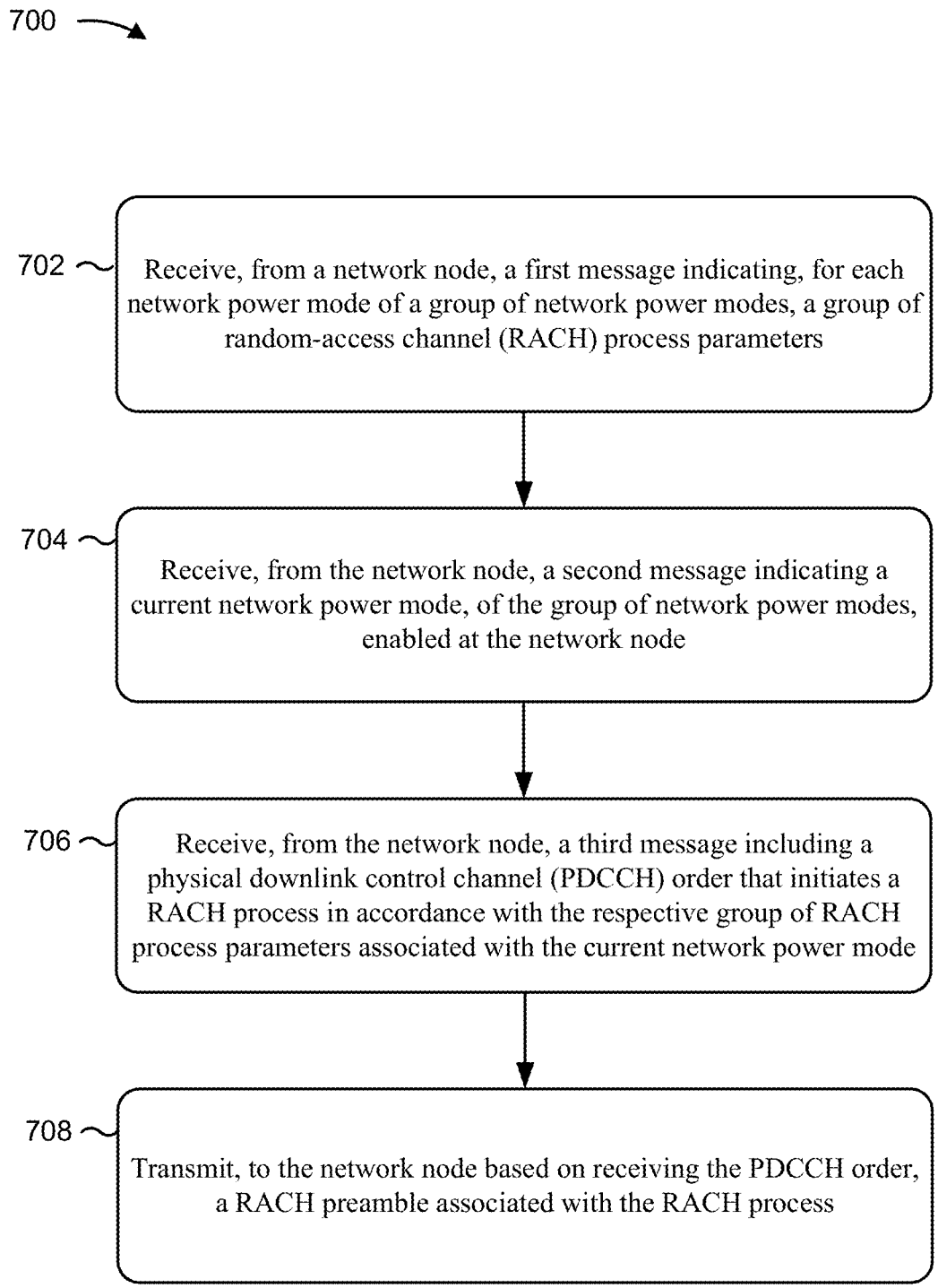
FIG. 7 is a flow diagram illustrating an example process performed by the UE, in accordance with various aspects of the present disclosure.

FIG. 7 is a flow diagram illustrating an example process 700 performed by a UE 120, in accordance with some aspects of the present disclosure. The example process 700 is an example of adapting RACH process parameters to a current network power mode. As shown in FIG. 7, the process 700 begins at block 702 by receiving, from a network node, a first message indicating, for each network power mode of a group of network power modes, a group of RACH process parameters. At block 704, the process 700 receives, from the network node, a second message indicating a current network power mode, of the group of network power modes, enabled at the network node. At block 706, the process 700 receives, from the network node, a third message including a PDCCH order that initiates a RACH process in accordance with the respective group of RACH process parameters associated with the current network power mode. At block 708, the process 700 transmits, to the network node based on receiving the PDCCH order, a RACH preamble associated with the RACH process.

Figure 8:
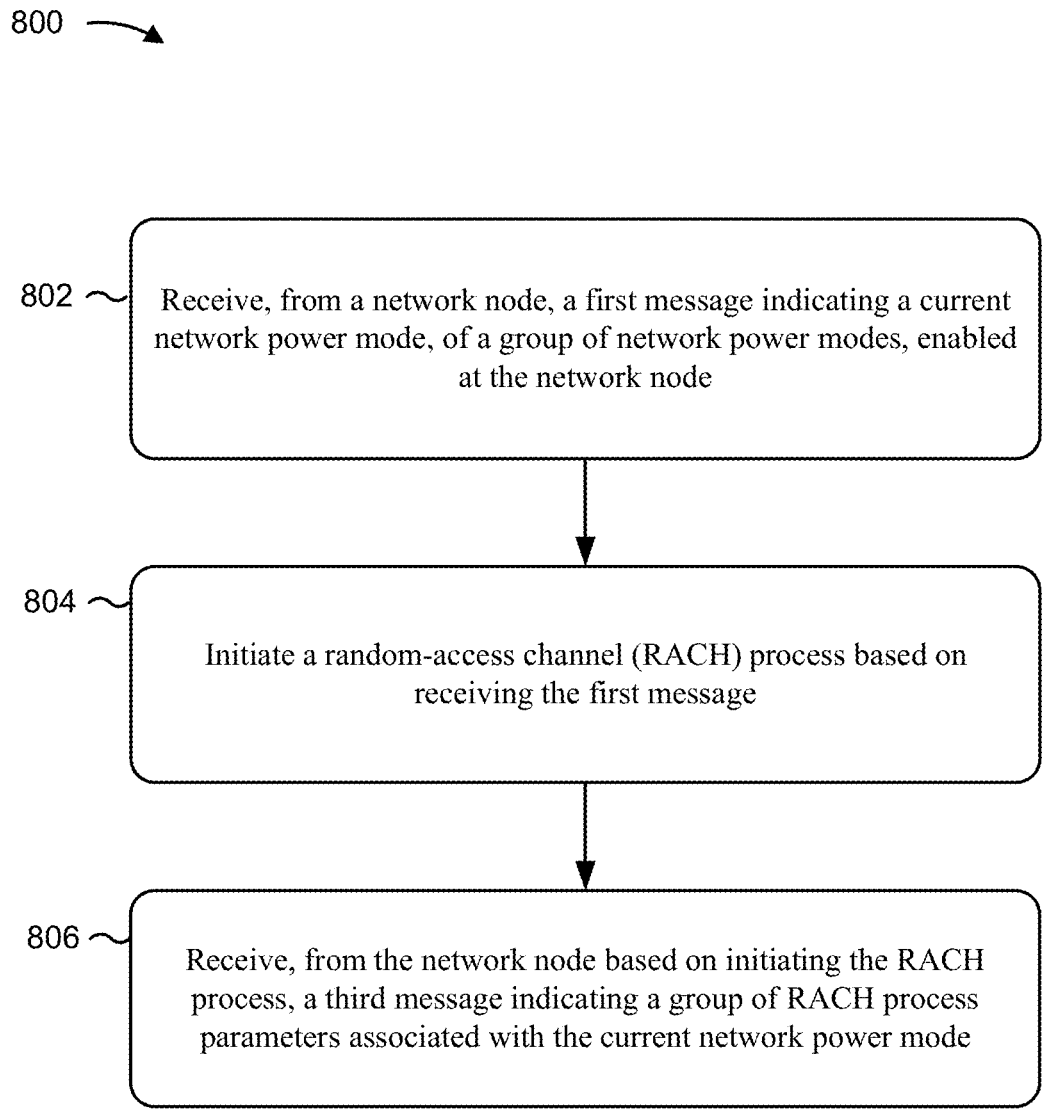
FIG. 8 is a flow diagram illustrating an example of a process performed by the UE, in accordance with various aspects of the present disclosure.

FIG. 8 is a flow diagram illustrating an example process 800 performed by a UE 120, in accordance with some aspects of the present disclosure. The example process 800 is an example of adapting RACH process parameters to a current network power mode. As shown in FIG. 8, the process 800 begins at block 802 by receiving, from a network node, a first message indicating a current network power mode, of a group of network power modes, enabled at the network node. At block 804, the process 800 initiates a RACH process based on receiving the first message. At block 806, the process 800 receives, from the network node based on initiating the RACH process, a third message indicating a group of RACH process parameters associated with the current network power mode.

Figure 9:
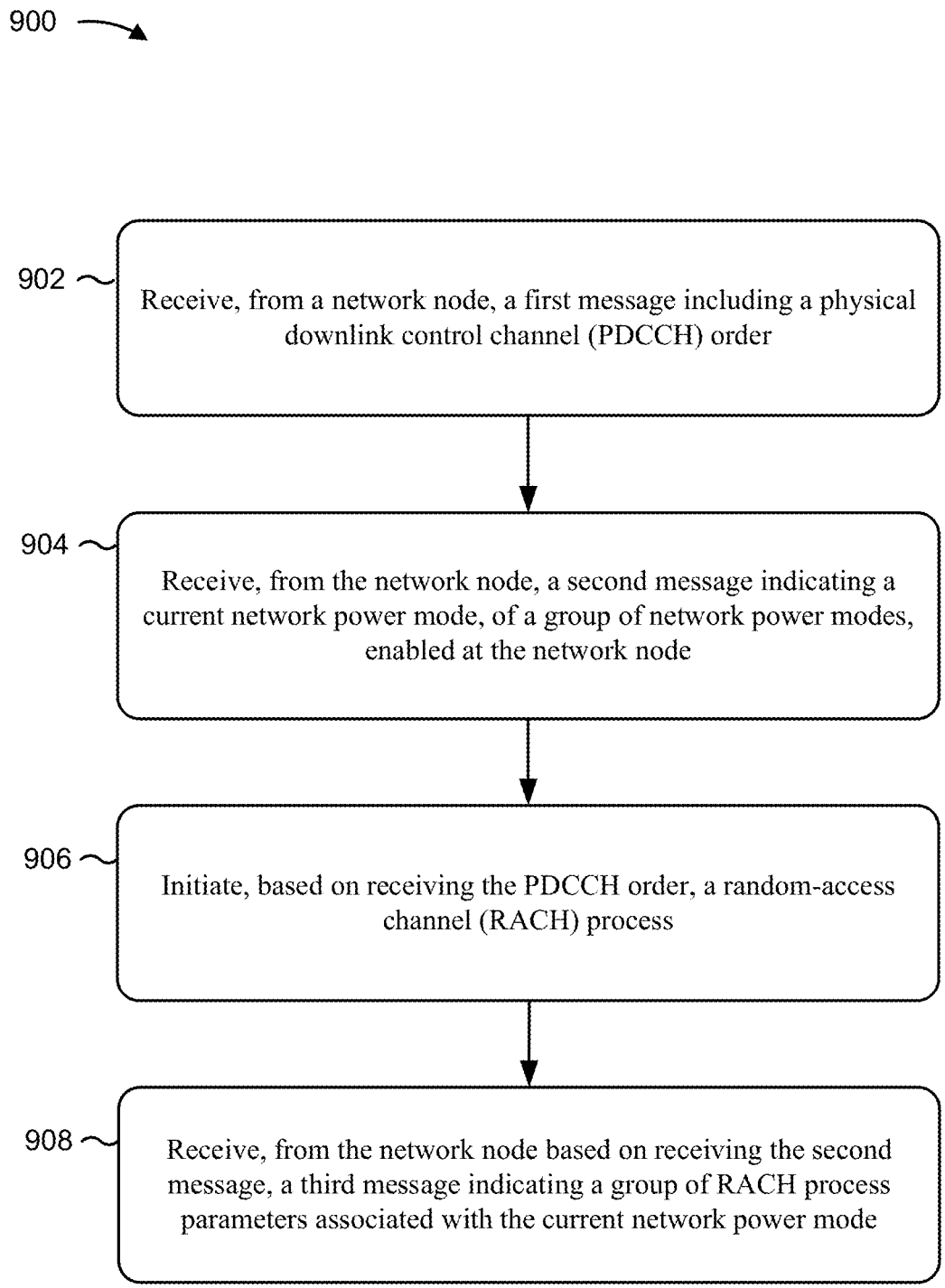
FIG. 9 is a flow diagram illustrating an example of a process performed by the UE, in accordance with various aspects of the present disclosure.

FIG. 9 is a flow diagram illustrating an example process 900 performed by a UE 120, in accordance with some aspects of the present disclosure. The example process 900 is an example of adapting RACH process parameters to a current network power mode. As shown in FIG. 9, the process 900 begins at block 902 by receiving, from a network node, a first message including a PDCCH order. At block 904, the process 900 receives, from the network node, a second message indicating a current network power mode, of a group of network power modes, enabled at the network node. At block 906, the process 900 initiates, based on receiving the PDCCH order, a RACH process. At block 908, the process 900 receives, from the network node based on receiving the second message, a third message indicating a group of RACH process parameters associated with the current network power mode.

Implementation examples are described in the following numbered clauses:

Clause 1. A method for wireless communication by a UE, comprising: receiving, from a network node, a first message indicating, for each network power mode of a group of network power modes, a group of RACH process parameters;
receiving, from the network node, a second message indicating a current network power mode, of the group of network power modes, enabled at the network node; receiving, from the network node, a third message including a PDCCH order that initiates a RACH process in accordance with the respective group of RACH process parameters associated with the current network power mode; and transmitting, to the network node based on receiving the PDCCH order, a RACH preamble associated with the RACH process.

Clause 2. The method of Clause 1, wherein each group of RACH process parameters includes one or more of an RSRP threshold value for selecting an SSB, an initial value for a random access preamble power, a power ramping factor for random access preamble retransmissions, or a maximum number of random access preamble transmissions.

Clause 3. The method of any one of Clauses 1-2, wherein the first message is an MIB, an SIB, or on-demand SI.

Clause 4. The method of any one of Clauses 1-3, wherein each group of RACH process parameters includes a first set of RACH process parameters associated with a four-step RACH process and a second set of RACH process parameters associated with a two-step RACH process.

Clause 5. The method of any one of Clauses 1-4, wherein the group of network power modes includes one or both of a group of compensation modes or a group of network energy saving modes.

Clause 6. The method of any one of Clauses 1-5, further comprising receiving, from the network node, a fourth message indicating a group of RACH process threshold values, wherein: each group of RACH process parameters includes a group of offset values; and each offset value of the group of offset values is an offset from a respective RACH process threshold value of the group of RACH process threshold values.

Clause 7. The method of any one of Clauses 1-6, wherein: the first message is an RRC message; and each group of RACH process parameters includes one or both of a set of RSRP threshold parameters or a set of power ramping factor parameters.

Clause 8. The method of Clause 7, wherein each RSRP threshold parameter of the set of RSRP threshold parameters corresponds to a respective SSB reduction value, of a group of SSB reduction values, associated with a respective network power mode of the group of network power modes.

Clause 9. The method of Clause 7, wherein each RSRP threshold parameter of the set of RSRP threshold parameters and each power ramping factor parameter of the set of power ramping factor parameters corresponds to a respective antenna configuration, of a group of antenna configurations, associated with a respective network power mode of the group of network power modes.

Clause 10. A method for wireless communication by a UE, comprising: receiving, from a network node, a first message indicating a current network power mode, of a group of network power modes, enabled at the network node; initiating a RACH process based on receiving the first message; and receiving, from the network node based on initiating the RACH process, a third message indicating a group of RACH process parameters associated with the current network power mode.

Clause 11. The method of Clause 10, wherein the third message is an RRC message.

Clause 12. The method of any one of Clauses 10-11, wherein the RACH process is a contention-based RACH process.

Clause 13. The method of any one of Clauses 10-12, further comprising receiving, from the network node prior to initiating the RACH process, signaling indicating resources for the RACH process, wherein the RACH process is a contention-free RACH process.

Clause 14. The method of Clause 13, further comprising transmitting, to the network node based on initiating the RACH process, a RACH preamble associated with the RACH process, wherein the RACH preamble is transmitted on the resources indicated in the signaling.

Clause 15. The method of any one of Clauses 10-14, wherein the UE fails to receive or decode a fourth message including a including a PDCCH order.

Clause 16. The method of any one of Clauses 10-15, wherein the group of network power modes includes one or both of a group of network power saving modes or a compensation mode.

Clause 17. A method for wireless communication by a UE, comprising: receiving, from a network node, a first message including a PDCCH order; receiving, from the network node, a second message indicating a current network power mode, of a group of network power modes, enabled at the network node; initiating, based on receiving the PDCCH order, a RACH process; and
receiving, from the network node based on receiving
the second message, a third message indicating a group
of RACH process parameters associated with the current network power mode.

Clause 18. The method of Clause 17, further comprising
transmitting, to the network node based on initiating
the RACH process, a RACH preamble associated with
the RACH process, wherein the PDCCH order configures resources for the RACH preamble.

Clause 19. The method of any one of Clauses 17-18,
wherein the third message is an RRC message.

Clause 20. The method of any one of Clauses 17-19,
wherein the RACH process is a contention-free RACH
process.

Clause 21. The method of any one of Clauses 17-20,
wherein the group of network power modes includes
one or both of a group of network power saving modes
or a compensation mode.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:
   receiving, from a network node, a first message indicating, for each network power mode of a group of network power modes, a respective group of random-access channel (RACH) process parameters for a RACH process performed in accordance with the respective group of RACH process parameters;
   receiving, from the network node, a second message indicating a current network power mode, of the group of network power modes, enabled at the network node;
   receiving, from the network node, a third message including a physical downlink control channel (PDCCH) order that initiates the RACH process in accordance with the respective group of RACH process parameters associated with the current network power mode; and
   transmitting, to the network node based on receiving the PDCCH order, a RACH preamble associated with the RACH process.

2. The method of claim 1, wherein each group of RACH process parameters includes one or more of a reference signal received power (RSRP) threshold value for selecting a synchronization signal block (SSB), an initial value for a random access preamble power, a power ramping factor for random access preamble retransmissions, or a maximum number of random access preamble transmissions.

3. The method of claim 1, wherein the first message is a master information block (MIB), a system information block (SIB), or on-demand system information (SI).

4. The method of claim 1, wherein each group of RACH process parameters includes a first set of RACH process parameters associated with a four-step RACH process and a second set of RACH process parameters associated with a two-step RACH process.

5. The method of claim 1, wherein the group of network power modes includes one or both of a group of compensation modes or a group of network energy saving modes.

6. The method of claim 1, further comprising receiving, from the network node, a fourth message indicating a group of RACH process threshold values, wherein:
   each group of RACH process parameters includes a group of offset values; and
   each offset value of the group of offset values is an offset from a respective RACH process threshold value of the group of RACH process threshold values.

7. The method of claim 1, wherein:
   the first message is a radio resource configuration (RRC) message; and
   each group of RACH process parameters includes one or both of a set of reference signal received power (RSRP) threshold parameters or a set of power ramping factor parameters.

8. The method of claim 7, wherein each RSRP threshold parameter of the set of RSRP threshold parameters corresponds to a respective synchronization signal block (SSB) reduction value, of a group of SSB reduction values, associated with a respective network power mode of the group of network power modes.

9. The method of claim 7, wherein each RSRP threshold parameter of the set of RSRP threshold parameters and each power ramping factor parameter of the set of power ramping factor parameters corresponds to a respective antenna configuration, of a group of antenna configurations, associated with a respective network power mode of the group of network power modes.

10. An apparatus for wireless communications at a user equipment (UE), comprising:
at least one processor; and
at least one memory coupled with the at least one processor and storing instructions operable, when executed by the at least one processor, to cause the apparatus to:
receive, from a network node, a first message indicating, for each network power mode of a group of network power modes, a respective group of random-access channel (RACH) process parameters for a RACH process performed in accordance with the respective group of RACH process parameters;
receive, from the network node, a second message indicating a current network power mode, of the group of network power modes, enabled at the network node;
receive, from the network node, a third message including a physical downlink control channel (PDCCH) order that initiates the RACH process in accordance with the respective group of RACH process parameters associated with the current network power mode; and
transmit, to the network node based on receiving the PDCCH order, a RACH preamble associated with the RACH process.

11. The apparatus of claim 10, wherein each group of RACH process parameters includes one or more of a reference signal received power (RSRP) threshold value for selecting a synchronization signal block (SSB), an initial value for a random access preamble power, a power ramping factor for random access preamble retransmissions, or a maximum number of random access preamble transmissions.

12. A method for wireless communication by a user equipment (UE), comprising:
receiving, from a network node, a first message indicating a current network power mode, of a group of network power modes, enabled at the network node;
initiating a random-access channel (RACH) process based on receiving the first message; and
receiving, from the network node based on initiating the RACH process, a third message indicating a group of RACH process parameters associated with the current network power mode, the RACH process being performed in accordance with the group of RACH process parameters.

13. The method of claim 12, wherein the third message is a radio resource configuration (RRC) message.

14. The method of claim 12, wherein the RACH process is a contention-based RACH process.

15. The method of claim 12, further comprising receiving, from the network node prior to initiating the RACH process, signaling indicating resources for the RACH process, wherein the RACH process is a contention-free RACH process.

16. The method of claim 15, further comprising transmitting, to the network node based on initiating the RACH process, a RACH preamble associated with the RACH process, wherein the RACH preamble is transmitted on the resources indicated in the signaling.

17. The method of claim 12, wherein the UE fails to receive or decode a fourth message including a including a physical downlink control channel (PDCCH) order.

18. A method for wireless communication by a user equipment (UE), comprising:
receiving, from a network node, a first message including a physical downlink control channel (PDCCH) order;
receiving, from the network node, a second message indicating a current network power mode, of a group of network power modes, enabled at the network node;
initiating, based on receiving the PDCCH order, a random-access channel (RACH) process; and
receiving, from the network node based on receiving the second message, a third message indicating a group of RACH process parameters associated with the current network power mode, the RACH process being performed in accordance with the group of RACH process parameters.

19. The method of claim 18, further comprising transmitting, to the network node based on initiating the RACH process, a RACH preamble associated with the RACH process, wherein the PDCCH order configures resources for the RACH preamble.

20. The method of claim 18, wherein the RACH process is a contention-free RACH process.

* * * * *